Sept. 30, 1969    M. LA TORRE    3,469,762

TRANSPORTABLE LEAF COLLECTOR

Filed Aug. 29, 1967    2 Sheets-Sheet 1

MARIO La TORRE
INVENTOR

BY Popper, Bain, Bobis

ATTORNEYS

MARIO La TORRE
INVENTOR.

ATTORNEYS

United States Patent Office 3,469,762
Patented Sept. 30, 1969

3,469,762
TRANSPORTABLE LEAF COLLECTOR
Mario La Torre, 708 Eagle Rock Ave.,
West Orange, N.J. 07052
Filed Aug. 29, 1967, Ser. No. 664,039
Int. Cl. B65d 5/26, 5/24
U.S. Cl. 229—32  3 Claims

ABSTRACT OF THE DISCLOSURE

My invention relates to receptacles generally and specifically to a transportable leaf collector which may be quickly and easily filled with an abundance of loosely packed leaves, closed and thereafter transported with great ease by sliding along the ground to a point of disposal.

FIELD OF INVENTION

My invention relates generally to receptacles for the collection, retention and transport of loosely packed material such as leaves. Leaves, particularly when wet, are both bulky and heavy. The present practice is to rake leaves into a rather large pile and thereafter attempt to transport the same to a point of collection by means of either a wheeled vehicle such as a wheelbarrow, pushcart or the like or to carry the same in a bag or bag-like device formed from a large cloth laid upon the ground onto which the leaves are raked.

Recently, the mechanical lawn sweeper has met wide acceptance. In such sweepers, the leaves are thrown by sweeping brushes into a collection basket. However, these baskets rapidly become filled and therefore, must be frequently emptied during the process of sweeping. The frequency of emptying requires one to frequently push an already heavily laden sweeper including the brush mechanism and the collector to a distant location for discharge. When the basket can be removed from such sweepers, they are usually open at one end and therefore, must be tipped to retain the leaves. Moreover, handling such large baskets when full of leaves is next to impossible. Thus, lawn sweepers are not only difficult to operate but are time consuming.

Therefore, it is among the objects and advantages of my invention to provide a transportable leaf collector into which leaves may be quickly and easily raked or dumped.

Another object of my invention is to provide a transportable leaf collector which is provided with a smooth flat or slightly arcuate relatively rigid, bottom which may be easily slid along the ground when ladened with large quantities of leaves with the expenditure of very little effort.

Still another object of my invention is to provide a transportable leaf collector in which loosely packed leaves may be easily retained without spillage as the collector is slid across the ground even with abrupt or irregular movements.

Yet a further object of my invention is to provide a transportable leaf collector having at least three upstanding walls formed on a flat or slightly arcuate relatively rigid bottom and a fourth wall adapted to close one side thereof hingedly secured to the bottom and having means to detachably engage opposed side walls.

Still another object of my invention is to provide a transportable leaf collector which may be formed of plastic or cardboard or some other material which is either naturally water resistant or has been made water resistant by the application of sizing materials.

Still yet another object of my invention is to provide a transportable leaf collector which may be formed of die stamped and folded cardboard.

The following U.S. patents are broadly related to my transportable leaf collector and are characteristic of the prior art but do not anticipate the claims appended hereto: 20,811; 112,102; 2,510,311; 2,978,731; 3,170,183.

SUMMARY OF INVENTION

By way of summary, my invention is a transportable leaf collector comprising a smooth, generally rectangular base, a pair of opposed, upstanding side walls and an upstanding first end wall on the base defining a partial closure on three sides thereof, a second end wall hingedly secured to the opposite end of the base and foldable upwardly to engage the said, opposed side walls thereof to form a complete closure on four sides of the base and means for securing the second end wall to the opposed side walls.

More definitively, my invention comprises the transportable leaf collector as aforesaid one species of which has a second said end wall formed from a smooth, flat generally rectangular member dimensioned longer than the end of the base in a direction parallel thereto and wider than the side walls are high in a direction perpendicular to the end of the base, the said member being folded over upon itself along a line parallel to the end of the base on the side opposite thereof the said member being as wide as the side walls are high when folded whereby when the said second end wall is folded upwardly, the folded over portion thereof telescopically slides over the top edge of the opposed side walls, thus, providing means for retaining the second end wall in the vertical position engaged to the side walls.

Still more particularly, my invention comprises a blank for forming a transportable leaf collector comprising a normally flat member having pairs of spaced apart cuts extending inwardly from side edges thereof toward each other, each cut being parallel to and equally spaced from opposite end edges thereof. In one species, the blank is a normally flat, resiliently bendable, crease resistant, generally rectangular member and in another species, the blank is a flat, generally rectangular, foldable member.

PREFERRED EMBODIMENT OF INVENTION

The objects and advantages set forth above as well as other objects and advantages may be achieved by my invention, the preferred embodiment of which is illustrated in the drawings in which.

Figure 1:
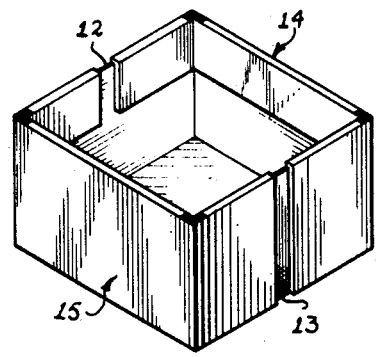
FIGURE 1 is a view in perspective of my leaf collector defining a closure on four sides of a base and open at the top.

Referring to the drawings in detail, the preferred embodiment of my leaf collector comprises a flat, generally rectangular base 11 and a pair of spaced apart, opposed generally parallel, upstanding side walls 12 and 13 respectively. A first upstanding end wall 14 is formed on the base 11 and engages the respective side walls 12 and 13 to form a closure on three sides of the base.

A second end wall 15 is hingedly secured to the opposite end of the base and is foldable upwardly to form a closure on four sides of the base as illustrated in FIGURE 1.

Figure 2:
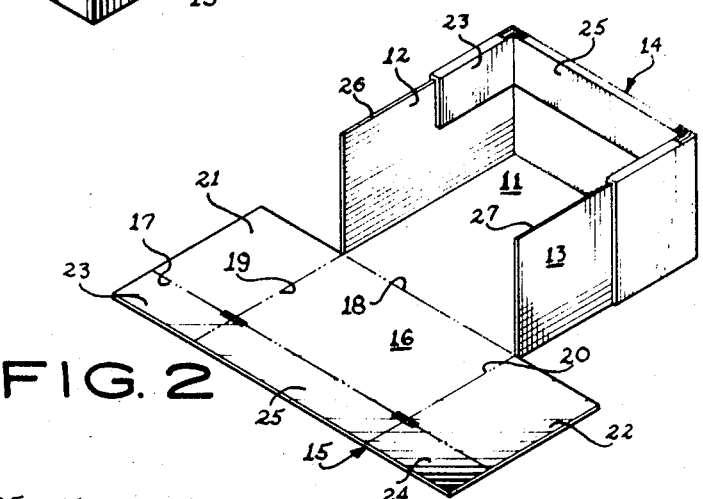
FIGURE 2 is a view in perspective of the leaf collector shown in FIGURE 1 in which one end thereof has been hingedly folded downwardly to open the closure on one side thereof.
Figure 3:
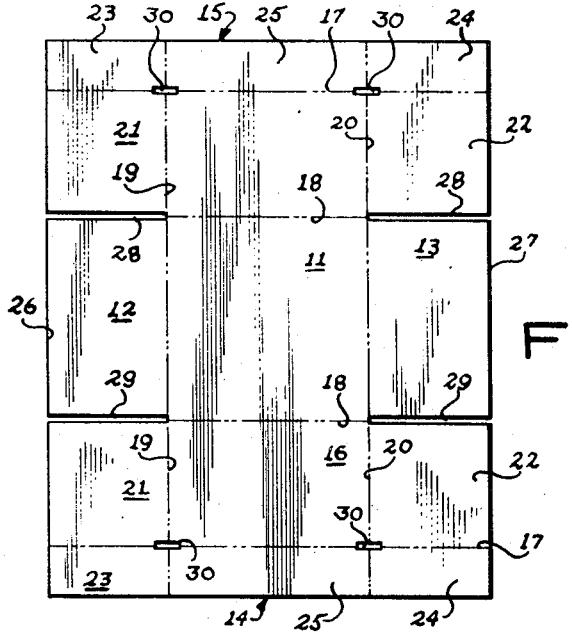
FIGURE 3 is a top plan view of a die cut blank which may be folded into my transportable leaf collector.

In order to form the end walls 14 and 15, I provide a novel, folding arrangement which is illustrated in greater detail in FIGURES 2 and 3. The end wall 15, and if desired, the end wall 14, is formed of a single, generally rectangular, foldable member 16 which is dimensioned longer than the end of the base 11 to which it is hingedly secured in a direction parallel thereto. The member 16 is also dimensioned in a direction perpendicular to the end of the base 11 longer than the height of the side walls 12 and 13. The member 16 is folded inwardly upon itself along a line 17 parallel to the end of the base 11. The distance between the fold line 17 and the hinge 18 between the end of the base 11 and the end wall 15 is equal to the height of the side walls 12 and 13. The opposed sides of the member 16 extending beyond the base 11 are folded along lines defined by the extension of the respective sides of the base, respectively 19 and 20 upwardly 90 degrees. Fold 17 must be made first, and folds 19 and 20 made thereafter. Fold 17 may be secured against unfolding as by a staple at the center point thereof. However, the segments between lines 19 and 20 respectively and the respective ends must be open.

When the member 16 is folded along lines 19 and 20, side panels 21 and 22 respectively are defined. When the member 16 is then folded upwardly along hinge 18, the side panels 21 and 22 slide along the outside of side walls 12 and 13 respectively. When the member 16 is folded along line 17, the folded over portion thereof defines a pair of opposed, folded over side portions respectively 23 and 24 and a folded over end portion 25. The folded over side portions 23 and 24 telescopically slide over the top edge of the side walls 12 and 13 respectively 26 and 27. The side panels 21 and 22 provide reinforcement for the side walls 12 and 13 whereas the folded over portion 25 provides reinfocrement for the end walls 14 and 15. The frictional engagement between the panel 21 and folded over portion 23 and the panel 22 and folded over portion 24 with the top edges respectively 26 and 27 of the side walls respectively 12 and 13 insure that the end walls 14 and 15 remain in an upright position.

In use, one of the end walls, illustrated in FIGURE 2 to be wall 15, may be folded downwardly along the hinge 18 which may be a simple folded line so that leaves may be swept up upon the downwardly folded end wall 15 into the three sides closure defined by the side walls 12 and 13 and the opposite end wall 14. When a sufficient quantity of leaves have been deposited in the partial closure, end wall 15 is folded upwardly to provide the four wall closure.

I have found that a container having a flat relatively rigid bottom may be easily slid along the ground with a minimum of force even when fully loaded with relatively heavy, bulky leaves. The container may be left in the open at a disposal point awaiting collection with little or no danger that the leaves will be scattered therefrom. However, if desired, one of the end walls 14 or 15 may be folded downwardly and the container emptied merely by tilting.

It is highly desirable to fabricate my leaf collector of some relatively inexpensive disposable material such as corrugated cardboard. Corrugated cardboard may be fabricated of sufficient rigidity and strength and sufficient resistance to moisture to be suitable for my purposes. The use of cardboard of some other material which is readily available in large sheets and which is easily die cut and foldable is particularly useful. Such material may be die cut in a pattern shown in FIGURE 3 and the pattern folded to produce my leaf collector.

Referring now to FIGURE 3, the blank is cut by means of a die or some other suitable instrument along pairs of spaced apart lines parallel to the end edges thereof defining cuts respectively 28, 28 and 29, 29 extending inwardly from the opposed side edges of the blank. Between respective cuts 28, 29 and 28, 29 there are defined the opposed side walls 12 and 13. The blank is foldable along a pair of lines 19 and 20 parallel to the side edges thereof extending through the terminal ends of the respective cuts 28, 29 and 28, 29. In addition, the blank may be folded along lines 17, 17 parallel to the opposed end edges thereof to define the respective folded over portions 23, 24 and 25. Relatively small rectangular cuts 30, 30 etc., are provided at each of the two pairs of intersections of fold lines 19 and 17 so as to facilitate folding and to prevent binding with the corners of the side walls 12 and 13.

Figure 4:
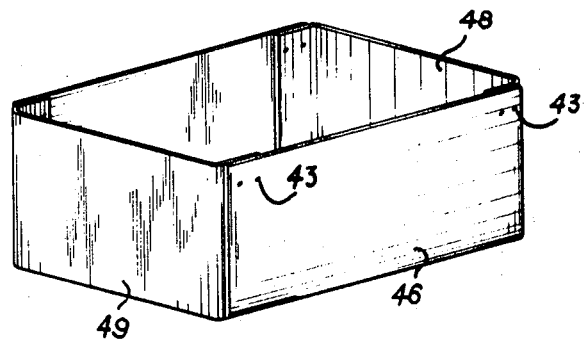
FIGURE 4 is a view in perspective of another form of my leaf collector.
Figure 5:
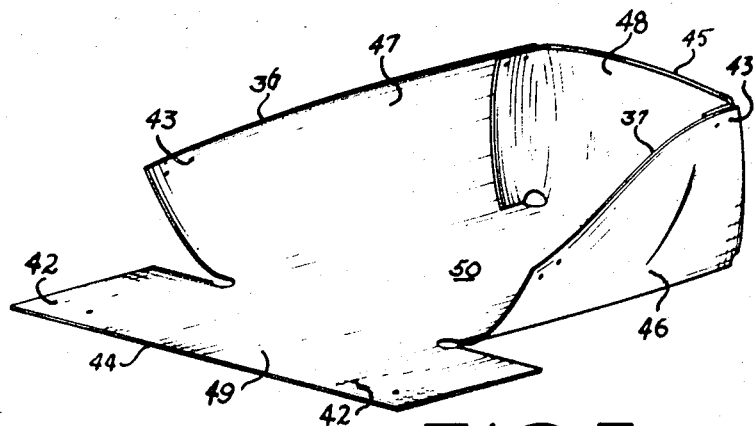
FIGURE 5 is a view in perspective of the leaf collector shown in FIGURE 1 in which one end thereof is open under the resilient influence of the material from which the collector is fabricated.
Figure 6:
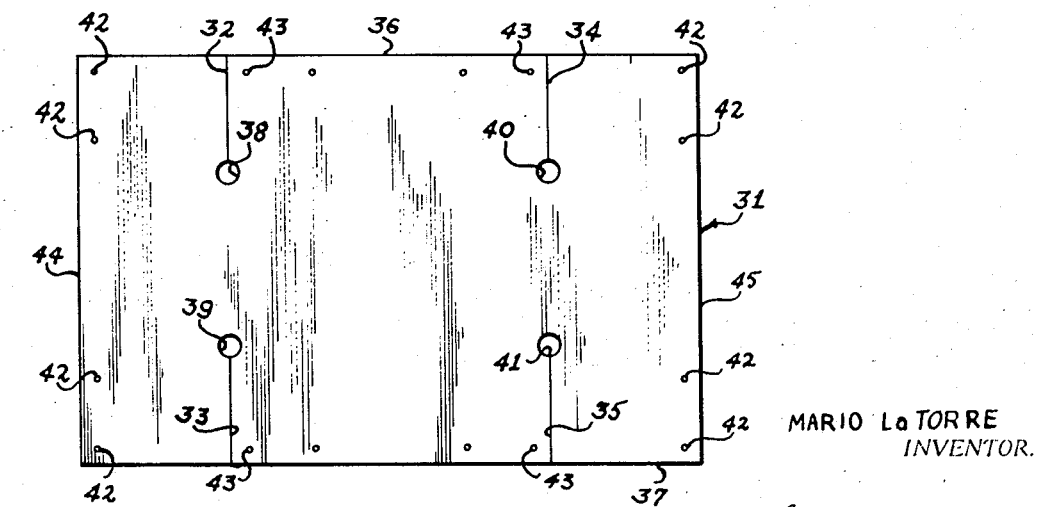
FIGURE 6 is a top plan view of a die cut blank which may be bendably formed into my transportable leaf collector.

Referring now specifically to the form of my invention illustrated in FIGURES 4, 5 and 6, my leaf collector comprises a single, integral blank or body member 31 which may be bendably formed into an enclosure illustrated in FIGURE 4. The blank or body member 31 is a normally flat, resiliently bendable, crease resistant, generally rectangular sheet having pairs of axially opposed, spaced apart cuts, respectively 32–33 and 34–35 extending inwardly from opposed side edges 36 and 37 of the blank 31. Each of the cuts inwardly terminates in a transverse circular hole respectively 38, 39, 40 and 41. Cooperative fasteners 42, 42 etc., are attached to the blank 31 adjacent to the respective end edges 44 and 45. Cooperative fasteners 43, 43 etc., are attached to the blank 31 adjacent to the respective side edges 36, 37. Cooperative, interengaging fasteners 42, 43 are positioned on opposite sides of the blank 31.

The enclosure is formed by bending the blank 31 upwardly from the side edges 36, and 37 intermediate the cuts 32–33 and 34–35 to define a pair of opposed and generally upstanding side walls 46 and 47. The blank 31 is then folded upwardly from the end wall 45 folding the immediately adjacent portions of the side walls 36 and 37 inwardly as illustrated in FIGURES 4 and 5 until the respective cooperative fasteners 42–43 are in position for usual engagement. There is, thus, defined an end wall 48.

Since the blank 31 is fabricated of a normally flat, resiliently bendable, crease resistant material, the leaf collector assumes the configuration illustrated in FIGURE 5 when the end wall 48 has been engaged to the respective side walls 46 and 47. The side walls are generally upstanding at the point of engagement with the end wall 48 but progressively flare outwardly towards the opposite end wall 49. The end wall 49 lays flat under the normal resilience of the material from which the blank 31 is fabricated thereby providing an extended lip for raking leaves into the three-sided enclosure defined by the end wall 48 and the side walls 46 and 47. Moreover, the flaring side walls 46 and 47 provide a funnel-like arrangement which aids the raking of leaves thereinto.

After a sufficient quantity of leaves have been raked into the collector, the end wall 49 is bent upwardly and the opposed side portions therein bent inwardly so that the cooperative fasteners may be engaged to produce the four-sided enclosure illustrated in FIGURE 4. Since the blank is formed of a normally flat, resiliently bendable, crease resistant material, the base or bottom 50 assumes a smoothly arcuate configuration particularly at the point of intersection with the respective end walls and side walls thereby materially aiding movement of the collector along the ground since no sharp edges are presented.

The holes 38, 39, 40 and 41 are provided in the blank 31 to facilitate the forming of the enclosure as illustrated in FIGURES 4 and 5 by the removal of the material which might become compressed.

After the leaf collector has been transported to a point of disposal, the end wall 49 is again unfastened from the side walls 46 and 47 and normally flops downwardly in response to the normal resilience of the material. The leaves may be raked out or the end wall 48 simply lifted to dump the contents. Of course, the normal flexible resilience of the blank material greatly aids in discharge.

I claim:
1. A transportable leaf collector comprising,
   (a) a generally rectangular, normally flat resiliently bendable substantially crease resistant member having pairs of colinear, spaced apart cuts of equal length extending perpendicularly inwardly from opposed side edges thereof, each pair of cuts spaced away from the respective closest end edge of the said member a distance no greater than the length of the cut,
   (b) a base and a pair of opposed, generally upstanding side walls on the base defined by upwardly bent portions of the said member intermediate pairs of adjacent cuts on opposite sides thereof,
   (c) a pair of opposed, generally upstanding end walls on the base defined by upwardly bent portions of the said member intermediate the respective end edges thereof and the closest pair of colinear cuts,
   (d) opposed side edge portions of the end walls being bent inwardly toward each other to engage and be secured to the respective side walls, the said edge portions of at least one end wall being detachably secured to the respective side walls by manually operable means,
   (e) each of the aforesaid bends of the said member being an uncreased, smooth continuous, substantial arc.
2. A transportable leaf collector comprising,
   (a) the structure in accordance with claim 1 in which,
   (b) the member is sufficiently normally resilient that either end wall normally lies substantially flat in the plane of the base when disengaged from the respective side walls.
3. A transportable leaf collector comprising,
   (a) the structure in accordance with claim 2 and,
   (b) an enlarged opening at the inwardly terminal end of each colinear cut on the end of the member wherein the end wall is detachably secured to the respective side walls.

References Cited

UNITED STATES PATENTS

| | | | |
|---|---|---|---|
| 132,074 | 10/1872 | Heyl | 229—32 |
| 132,942 | 11/1872 | Weston | 229—32 |
| 1,736,720 | 11/1929 | Myers | 229—34 |
| 2,022,566 | 11/1935 | Joslin | 229—32 X |
| 2,200,320 | 5/1940 | Zalkind | 229—32 |
| 2,440,077 | 4/1948 | Clark | 229—32 |
| 2,629,535 | 2/1953 | Ullrich | 229—34 |
| 3,019,957 | 2/1962 | Palmer | 229—35 X |
| 2,718,348 | 9/1955 | Montfort | 229—37 |

FOREIGN PATENTS

| | | |
|---|---|---|
| 890,292 | 2/1962 | Great Britain. |
| 489,127 | 1/1954 | Italy. |
| 84,992 | 2/1955 | Norway. |

DONALD F. NORTON, Primary Examiner

U.S. Cl. X.R.
15—257.6; 229—34